Aug. 25, 1970 W. N. BAINBRIDGE 3,525,511
SHOCK ABSORBERS
Filed Feb. 8, 1968
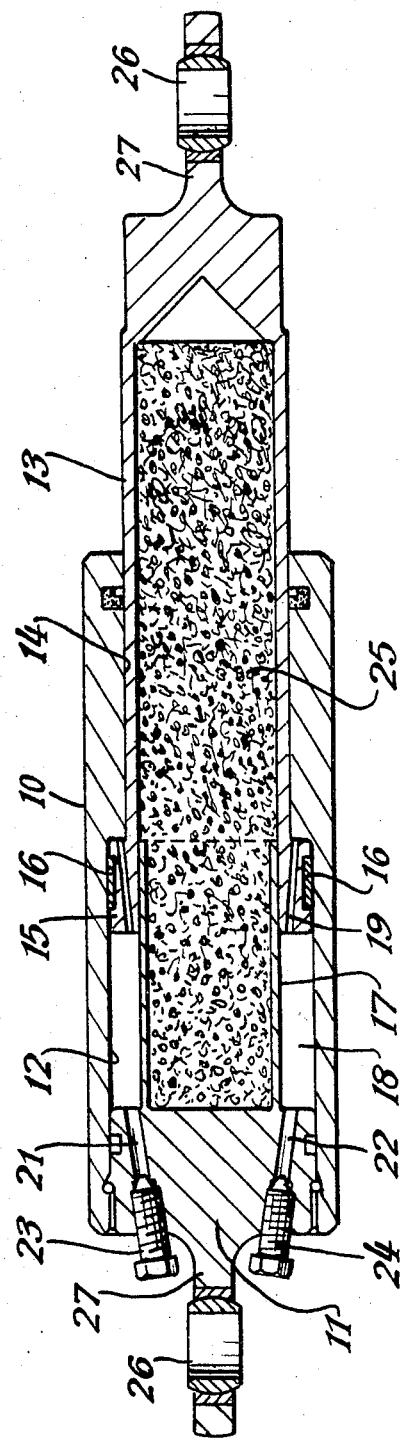
INVENTOR
BY Wilfred N. Bainbridge
Lawrence J. Winter
ATTORNEY 3,525,511
SHOCK ABSORBERS
Wilfred N. Bainbridge, Leamington Spa, England, assignor to Automotive Products Company Limited, Leamington Spa, England
Filed Feb. 8, 1968, Ser. No. 703,992
Claims priority, application Great Britain, Feb. 10, 1967, 6,423/67
Int. Cl. F16f 7/12
U.S. Cl. 267—64                    7 Claims

ABSTRACT OF THE DISCLOSURE

A shock absorber of the telescopic kind comprising a plunger slidable in a cylinder, the inward movement of the plunger in the cylinder resulting in the flow of hydraulic liquid from one chamber to another in the shock absorber, the outward or return movement of the plunger being effected by a load which is created as the plunger moves inwardly the load being produced by compression of a cellular elastomeric material in a space in the shock absorber.

---

The present invention relates to shock absorbers of the telescopic kind comprising a plunger slidable in a cylinder, the inward movement of the plunger in the cylinder resulting in the flow of hydraulic liquid from one chamber to another in the shock absorber, the outward or return movement of the plunger being effected by a load which is created as the plunger moves inwardly.

The invention has for an object to provide an improved construction of shock absorber of the kind above referred to.

According to the invention, a shock absorber of the telescopic kind comprises a cylinder closed at one end by an end wall, a hollow plunger slidable in the cylinder, a tubular member slidable in the hollow plunger and defining therewith a cylindrical space, cellular elastomeric material contained in the said cylindrical space so as to be compressed as the plunger moves inwardly in the cylinder, said tubular member forming, with the surrounding wall of the cylinder, an annular space for liquid, and the plunger being so constructed and arranged that axial movement thereof relative to the cylinder displaces liquid in the said annular space through flow restricting means to damp the said relative movement.

One form of shock absorber according to the invention will now be described by way of example with reference to the accompanying drawing, the single figure of which is a longitudinal section of the shock absorber.

Referring to the drawing a cylinder 10 closed at one end by an end wall formed by a plug 11 suitably secured in position therein has a stepped bore providing bore portions of two diameters, the larger diameter bore portion 12 extending from the closed end. A hollow plunger 13 slidable in the smaller-diameter bore portion 14 of the cylinder and having an annular enlargement 15 lying in the cylinder bore portion 12 extends out of the cylinder and is closed at its outer end. The annular enlargement 15 of the plunger is grooved circumferentially to receive a piston ring 16 engaging the wall of the cylinder bore portion 12. A sleeve 17 secured to the plug 11 extends co-axially into the cylinder 10 through the bore portion 12 thereof and into the bore of the plunger 13, being a close sliding fit in the plunger bore. The sleeve 17 forms with the larger bore portion 12 of the cylinder 10, an annular space 18 in which the annular enlargement 15 of the plunger is slidable, the said enlargement dividing the annular space 18 into two chambers. A plurality of holes 19 extending through the enlargement 15 connect the said chambers one to the other. Two passages 21, 22 in the end plug 11, closed by plugs 23, 24, provide for the filling of the annular space 18 with liquid and for allowing the escape of air from the said space whilst it is being filled with liquid.

The cylindrical space within the plunger bore and the sleeve 17 contains a cylindrical body 25 of cellular expanded material such as natural or synthetic rubber, the interstices of which form air pockets. The material forming the cylindrical body is preferably of the closed cell type and completely or substantially completely fills the cylindrical space when the plunger 13 is in its outermost position relative to the cylinder, as it is shown in the drawing.

The sleeve 17 may be replaced by a tubular member separate from the plug 11 and closed at its end adjacent the said plug by an end wall which abuts against the internal surface of the plug.

Thus movement of the plunger inwardly of the cylinder when the shock absorber is subjected to a compressive load compresses the cylindrical body and the air contained in the interstices thereof, to store energy which acts to extend the shock absorber when the compressive load is released. The cylindrical body therefore serves as a spring to extend the shock absorber.

During both compression and extension of the shock absorber, liquid is forced through the holes 19 from one chamber of the annular space 18 to the other, the said holes serving as flow restricting means, the restriction of flow through which damps the relative movements of the cylinder and plunger.

The plug 11 and the closed end of the plunger 13 are each provided with coupling means for connecting them to parts between which the shock absorber is to be mounted, for example, as shown in the drawing, bushes 26 with external spherical surfaces may be mounted in lugs 27 at the ends of the shock absorber to receive mounting pins.

I claim:
1. A shock absorber of the telescopic type comprising an open end cylinder, a hollow plunger open at one end winding through said open end and slidably disposed within said cylinder, said cylinder having an enlarged bore adjacent its closed end, said plunger having an enlarged head slidable disposed in said enlarged bore, a tubular sleeve with an open end secured to said closed end of the cylinder, said sleeve having its open end extending into said plunger open end, said sleeve being of smaller diameter than said enlarged bore to provide an annular liquid space therearound, compressible cellular elastomeric material substantially filling the space within said plunger and sleeve for compression as the plunger moves inwardly through the cylinder open end, and means in communication with said annular space and the oppo- site side of said head to provide a liquid damping chamber disposed in parallel with said cellular material.

2. A shock absorber according to claim 1, wherein the tubular sleeve is formed integral with the end wall of the cylinder.

3. A shock absorber according to claim 1, wherein said cellular elastomeric material comprises a cylindrical body of said material substantially filling said space formed by the hollow plunger and sleeve when the plunger is in its fully extended position.

4. A shock absorber according to claim 3, wherein the cellular elastomeric material is rubber or synthetic rubber.

5. A shock absorber according to claim 3, wherein said cellular elastomeric material is a plastic material.

6. A shock absorber according to claim 3, wherein said cellular elastomeric material is of the closed cell type.

7. A shock absorber according to claim 1, wherein said enlarged head divides said annular space into two chambers, and said means comprises holes in said head providing for the restricted flow of liquid between said chambers.

References Cited

UNITED STATES PATENTS

| | | |
|---|---|---|
| 2,856,035 | 10/1958 | Rohacs. |
| 3,424,448 | 1/1969 | Chak Ma _____ 267—64 |

JAMES B. MARBERT, Primary Examiner